M. A. WAGNER.
SPRING ACTUATED WHEEL.
APPLICATION FILED MAY 14, 1915.
1,196,409.
Patented Aug. 29, 1916.
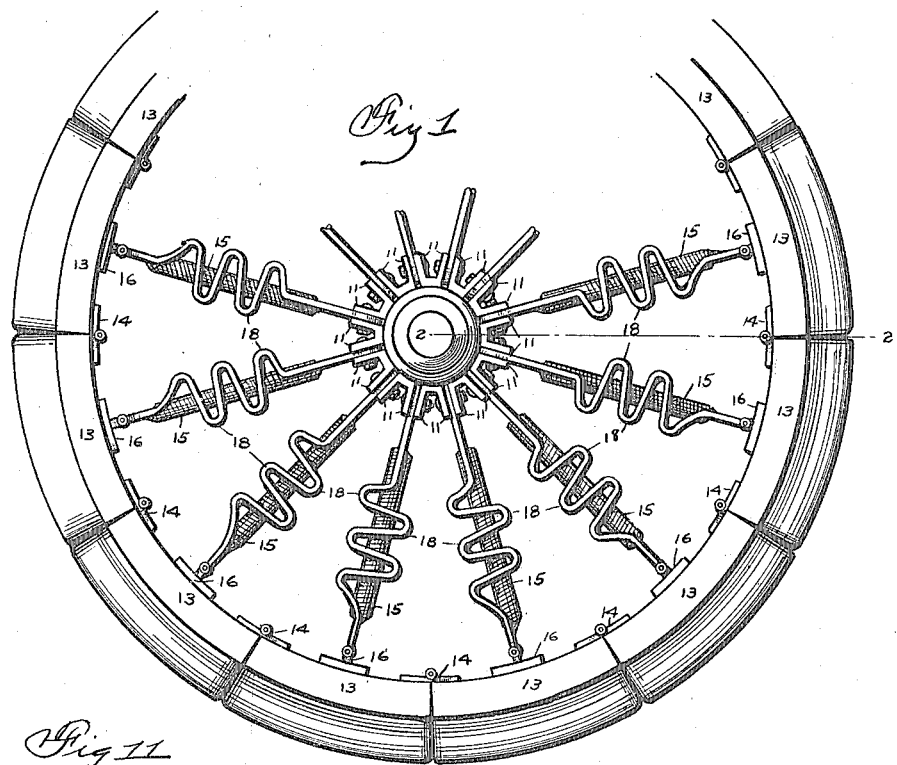
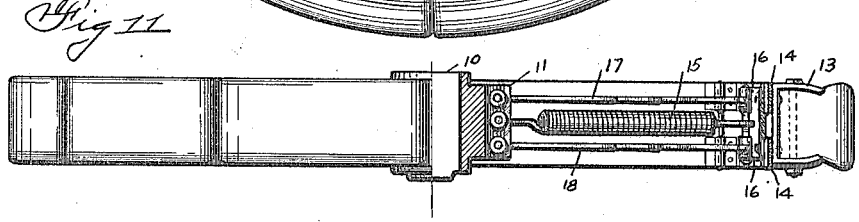
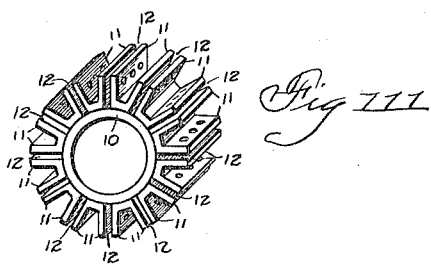
WITNESSES
INVENTOR
MARION A. WAGNER.
BY
ATTORNEY.

UNITED STATES PATENT OFFICE.

MARION A. WAGNER, OF DES MOINES, IOWA.

SPRING-ACTUATED WHEEL.

1,196,409.  Specification of Letters Patent.  Patented Aug. 29, 1916.

Application filed May 14, 1915. Serial No. 27,990.

*To all whom it may concern:*

Be it known that I, MARION A. WAGNER, a citizen of the United States, residing in Des Moines, county of Polk, and State of Iowa, have invented a new and useful Improvement in Spring-Actuated Wheels, of which the following is a specification.

The object of my invention is to provide a spring actuated wheel, adapted principally for automobile purposes, but equally adapted for all vehicles, in which the resiliency of the wheel is principally controlled by springs, a solid rubber tire, as distinguished from an air-inflated tire, being mounted on the outer periphery of the wheel.

A further object is to provide such a wheel in a simple, strong, durable and practically inexpensive construction.

My invention consists of certain details of construction, hereinafter set forth, pointed out in my claims, and illustrated in the accompanying drawings, in which—

Figure 1 shows a portion of a wheel in a side elevation, constructed in accordance with the teachings of my invention; Fig. 2 shows a plan elevation of the same, one half of said view being in section taken on the line 2—2 of Fig. 1; and Fig. 3 shows a detail view of the hub I employ.

Referring to the accompanying drawings, the reference numeral 10 is used to indicate the hub of my wheel which is provided with a plurality of outwardly projecting lugs 11, designed as bearings, and arranged uniformly in pairs, the pairs being evenly spaced and arranged around the outer surface of the hub. The pairs of lugs are arranged so that their outwardly extending flanges are parallel with the flange of the adjacent lugs, thus providing a space 12, between the said lugs, and it is in this space that my springs are mounted, each of the flanges of the lugs being provided with orifices designed to receive bolts to which my springs are secured. The felly of my wheel is divided into independent sections 13, of equal length, hinged to their adjacent section as shown at 14, the parts being so constructed that there is one section 13 radially disposed from each space 12 between the lugs 11.

The number 15 indicates coil springs extending from the hub to the inner surface of the rim of the wheel, the spring being secured on its inner end centrally in space 12, by means of a bolt passing through orifices in the parallel members of the adjacent lug 11, and through an eye in the end of the spring 15. The outer end of the spring is secured centrally in a bearing 16, centrally located on the inner surface of the rim of one of the sections 13, the mounting of the spring to this bearing being similar to the mounting hereinbefore described. On each side of the said spring I have provided a spring spoke, 17 and 18, respectively, this spring spoke being constructed in the manner shown in the drawings, and mounted in practically the same manner as is the coil spring 15, the mountings being clearly shown in the drawings.

It is obvious that each pair of springs, 17 and 18, pivotally mounted both to the hub of the wheel and their respective sections of the rim as shown, constitute the spokes for my wheel, and it is equally obvious that as each pair of these spring spokes are constructed as a heavy type of spring, that they will have a considerable degree of resiliency. One of the sections 13, being hinged to its adjacent sections, is controlled by movement from its adjacent section.

In practical operation, the wheel will slightly flatten or become elliptical when unduly resisted, as by hitting an obstruction, sufficient play between the segmental sections being provided to permit of such action. The coil springs 15 are for the purpose of bringing the wheel back to a perfect circular conformation, and the object of the spring spokes are to absorb the shock. Thus by using my improved wheel it is unnecessary to have an inflated tire, as a solid cushion tire will thoroughly answer all purposes.

I have chosen to show my wheel with a sectional cushion secured to each of the sections, 13, the cushion sections mating as shown, but if it is desired, a continuous cushion tire could be secured to the outer rim.

Having thus described my invention, what I claim and desire to secure by Letters Patent of the United States is:

In a spring wheel, a hub, an encircling rim composed of hingedly connected sections, and a radial set of springs for each rim section supporting the latter from the hub and comprising a central spiral spring, connected with the rim section and hub, and a spring on each of the opposite outer sides of the spiral spring having straight terminals connected to the hub and rim section and an intermediate wave portion consisting of a series of reverse bends extending circumferentially beyond the spiral spring, the springs of each set being disposed substantially within a common radial plane.

MARION A. WAGNER.

Witnesses:
ZELL G. ROE,
F. MOENCK.